Sept. 3, 1957 W. R. WILLIAMS, JR., ET AL 2,804,873
GREEN BEAN AND PEA SHELLING APPARATUS
Filed May 9, 1955 2 Sheets-Sheet 1
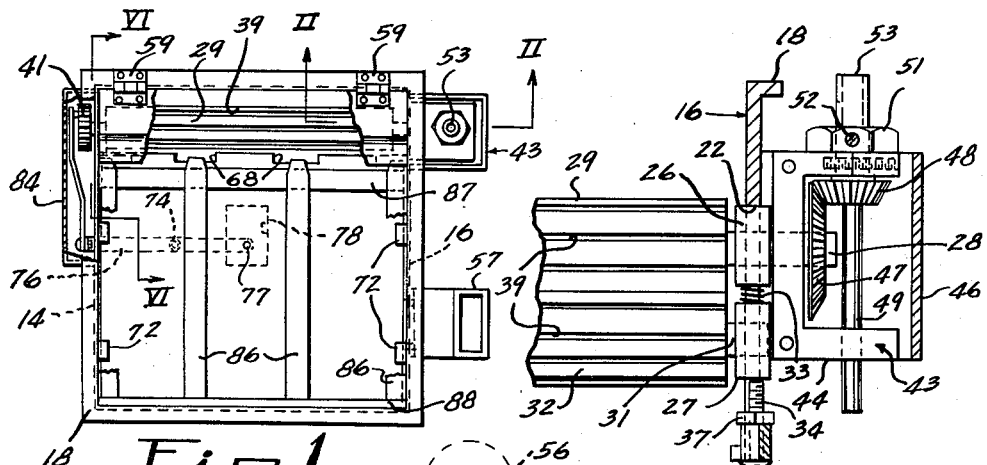
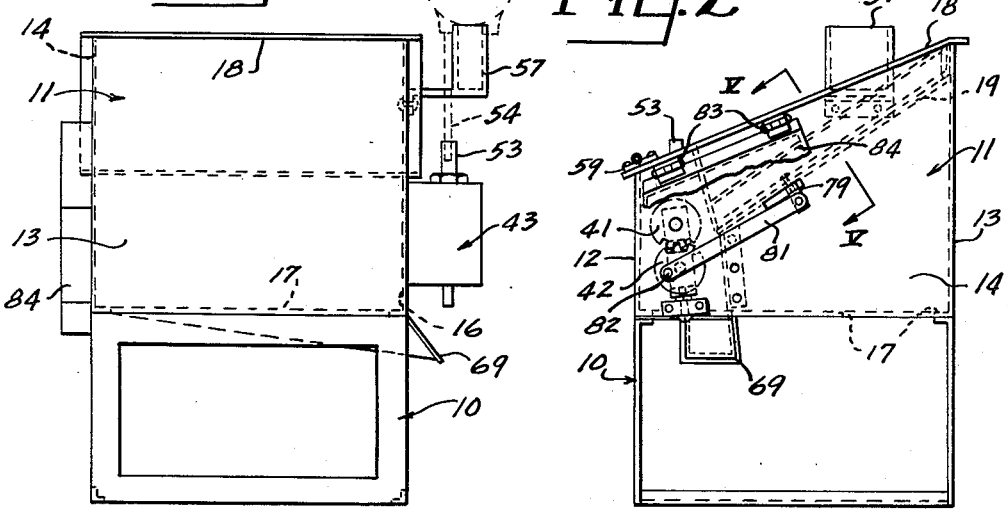
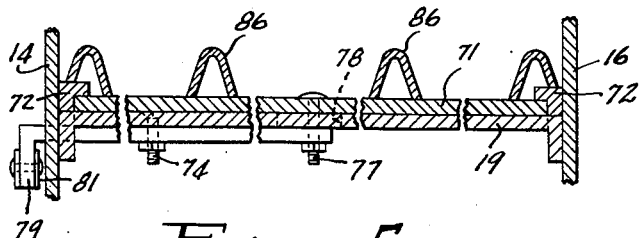
INVENTOR.
WILLIAM R. WILLIAMS JR.
LEWIS R. WILLIAMS
BY
Jennings & Carter
ATTORNEYS

United States Patent Office 2,804,873
Patented Sept. 3, 1957

2,804,873

GREEN BEAN AND PEA SHELLING APPARATUS

William R. Williams, Jr., and Lewis R. Williams, Birmingham, Ala.

Application May 9, 1955, Serial No. 506,792

1 Claim. (Cl. 130—30)

This invention relates to apparatus for shelling green beans and peas and has for an object the provision of such apparatus which shall include improved means for conveying the beans or peas endwise as they are being separated from their hulls.

Another object of our invention is to provide apparatus of the character designated which is adjustable for shelling different sizes of peas and beans and which is efficient in operation.

A further object of our invention is to provide green bean and pea shelling aparatus which shall be simple of construction, economical of manufacture and of a size to be driven by conventional type food mixers.

Briefly, our improved apparatus for shelling green beans and peas embodies a feed hopper having a downwardly sloping bottom wall which reciprocates during the shelling operation. Downwardly sloping substantially parallel guide members are mounted above the reciprocating bottom wall in position to aid further in aligning the beans and peas being shelled for endwise movement. A pair of shelling rollers are mounted adjacent the discharge end of the bottom wall in position to engage the hulls of the beans and peas being shelled.

Apparatus embodying features of our invention is shown in the accompanying drawings, in which:

Fig. 1 is a plan view;

Fig. 2 is a sectional view taken along the line II—II of Fig. 1;

Fig. 3 is a rear elevational view, showing the driving means in dotted lines;

Fig. 4 is a side elevational view;

Fig. 5 is a sectional view taken along line V—V of Fig. 4; and,

Figure 6:
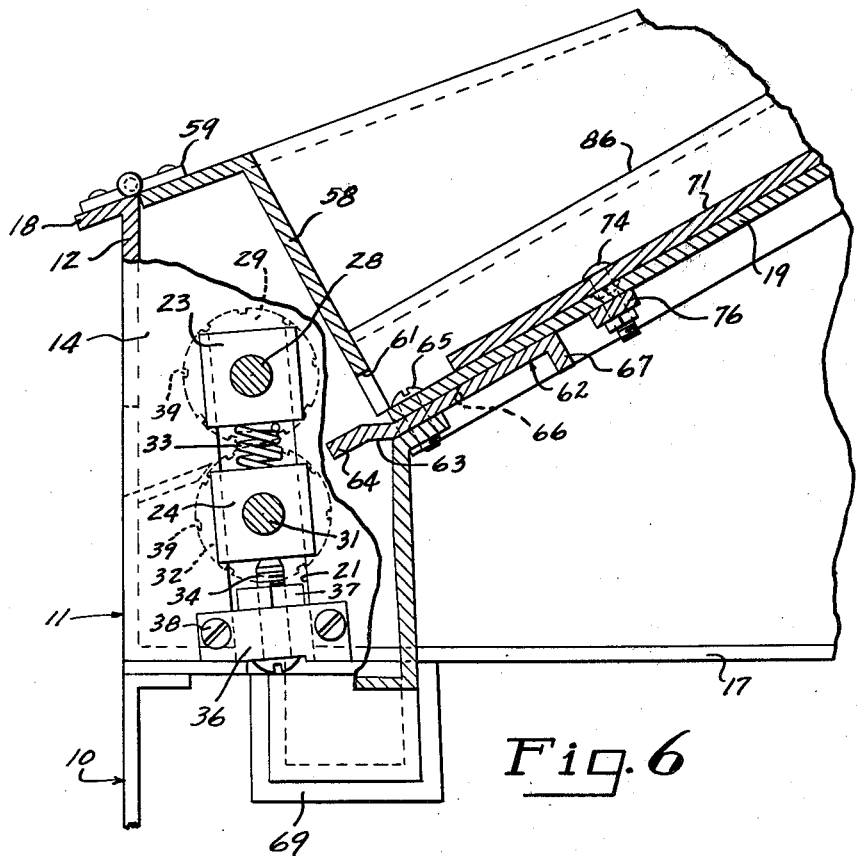
Fig. 6 is an enlarged detail view taken generally along the line VI—VI of Fig. 1.

Referring now to the drawings for a better understanding of our invention, we show a supporting frame 10 for a housing 11 which is preferably rectangular as viewed in transverse cross section. The housing 11 is provided with front and rear walls 12 and 13, respectively, and side walls 14 and 16. As shown in Fig. 4, the rear wall is higher than the front wall and the upper edges of the side walls slope downwardly from the upper end of the rear wall to the upper end of the front wall. Inturned reinforcing flanges 17 are provided at the lower edges of the housing 11 and outturned flanges 18 are provided at the upper edges thereof which surround the housing as shown.

Secured to the side walls 14 and 16 is a downwardly and forwardly sloping plate 19 which, together with the upper portions of the side walls 14 and 16 and the rear wall 13 define a feed hopper for receiving the beans and peas to be shelled. The plate 19 thus defines a sloping bottom wall for the hopper.

Substantially vertically extending, rectangular slots 21 and 22 are provided in the forward ends of the side walls 14 and 16 respectively. Mounted for sliding movement in the slot 21 are bearing blocks 23 and 24 and mounted for sliding movement in the slot 22 are bearing blocks 26 and 27. Extending transversely of the forward end of the housing 11 and mounted for rotation in the bearing blocks 23 and 26 is the shaft 28 of a shelling roller 29. In like manner, mounted for rotation in the bearing blocks 24 and 27 is the shaft 31 of a shelling roller 32. As shown in Figs. 2 and 6, the upper bearing blocks 23 and 26 are held in spaced relation to the lower bearing blocks 24 and 27 by means of compression springs 33. The positions of the lower bearing blocks 24 and 27 relative to the upper bearing blocks 23 and 26 are adjusted by means of adjusting screws 34 which are held in place by suitable brackets 36 and nuts 37. The brackets 36 are secured to the side walls 14 and 16 by means of screws 38. As shown in Figs. 1, 2 and 6, the shelling rollers 29 and 32 are provided with elongated, horizontal grooves 39 in the outer surfaces thereof which engage the hulls of the beans or peas being shelled and aid in drawing the same between the rollers.

Mounted on the ends of the shafts 28 and 31 outwardly of the side wall 14 are gears 41 and 42 which are in mesh with each other. As shown in Fig. 2, the end of the shaft 28 projects outwardly of the side wall 16 and slidably mounted thereon is a gear housing 43 which is preferably in the form of a U-shaped bracket 44 having an opening in the base thereof for receiving the end of the shaft 28. A U-shaped cover plate 46 surrounds the open portion of the bracket 44, as shown. Mounted non-rotatably on the shaft 28 within the gear housing 43 is a bevel gear 47 which meshes with a second bevel gear 48. The bevel gear 48 is mounted non-rotatably on a shaft 49 which is mounted for rotation in suitable openings in the legs of the U-shaped bracket 44. Axial movement of the shaft 49 is limited by a collar 51 which surrounds the shaft outwardly of the bracket 44 and is secured thereto by means of a set-screw 52. The end of the shaft 49 outwardly of the collar 51 is provided with a suitable fitting 53 for attaching the same to a suitable source of power, such as the driving elements 54 of a conventional type food mixer indicated generally in dotted lines at 56. A suitable bracket 57 is mounted adjacent the upper edge of the side wall 16 for supporting the food mixer 56 in the manner shown.

The shelling rollers 29 and 32 are separated from the feed hopper by means of a substantially L-shaped guard member 58 which is pivotally connected to the upper edge of the front wall 12 by means of hinges 59. A transverse opening 61 is provided at the lower end of the member 58 defining a passageway for the beans and peas being shelled whereby they may pass from the feed hopper into engagement with the shelling rollers.

Secured to the undersurface of the bottom wall 19 adjacent the lower end thereof is a plate member 62 having its lower end bent upwardly as at 63 and then downwardly at 64 whereby its upper surface lies in a plane parallel to the upper surface of the bottom wall 19. The plate 62 is held in adjusted positions relative to the shelling rollers by means of bolts 65 which pass through elongated openings 66 provided in the plate 62. The upper end of the plate 62 is bent downwardly as at 67 to add strength thereto. The lower end of the plate 62 is provided with a series of transversely spaced notches 68, as shown in Fig. 1, which aid in aligning the beans or peas endwise and provide openings whereby the shelled beans and peas may pass downwardly into a discharge chute 69 which is secured to the housing 11 as shown. The ends of the plate between the notches 68 are cupped upwardly slightly, to form slight troughs between the guides 86 presently to be described.

Mounted for sliding movement on the upper surface of the bottom wall 19 of the hopper is a plate forming a second bottom wall 71. Suitable inturned flanges or tabs 72 overlie the edges of the wall 71 and form guides therefor. Extending transversely beneath the bottom wall 19 and pivotally connected thereto by means of a bolt 74 is an arm 76. The inner end of the arm 76 is pivotally connected to the wall 71 by means of a bolt 77. A suitable opening 78 is provided in the bottom wall 19 for receiving the bolt 77 and permitting limited movement thereof whereby the wall 71 can be reciprocated or oscillated relative to the bottom wall 19. The other end of the arm 76 is bent downwardly as at 79. Pivotally connected to the end 79 is one end of a link 81. The other end of the link 81 is eccentrically connected to the gear 42 by means of a suitable pin 82. Hingedly connected adjacent the upper end of the side wall 14 by means of hinges 83 is a cover 84 for the gears 41 and 42 and the link 81.

To aid in aligning the beans and peas being shelled longitudinally whereby they are introduced between the pair of shelling rollers in an endwise direction, we provide a series of guide members 86 which extend substantially parallel to the side walls 14 and 16 and rest on the inturned tabs 72, as shown in Fig. 5. The lower ends of the guide members 86 are connected by a transverse strip 87 and the upper ends thereof are connected by a transverse member 88. As shown in Fig. 5, the guide members are of an inverted V-shape, as viewed in transverse section, whereby the beans or peas being shelled are directed inwardly between the guide members. The lower ends of the guide members engage the L-shaped member 58, as shown in Fig. 6, whereby they are held in place.

From the foregoing description, the operation of our improved apparatus for shelling green beans and peas will be readily understood. The beans or peas to be shelled are placed in the feed hopper a few at a time whereupon they move downwardly toward the opening 61 in the member 58. During downwardly movement of the peas or beans, the wall 71 is reciprocated by the arm 76 which is connected eccentrically to the gear 42 by the link 81. The vibrating or reciprocating movement of the wall 71 causes the beans or peas, as the case may be, to align lengthwise between the guide members 86 whereby they pass through the opening 61 and are presented endwise to the shelling rollers 29 and 32. The shelling rollers then engage the hulls causing the same to rupture whereby the peas or beans are forced from the hulls and fall between the shelling rollers and the lower end of the plate 62. The slots 68 form enlarged passageways for the peas or beans as they pass down into the discharge chute 69. The tension between the shelling rollers 29 and 32 is adjusted by turning the adjusting screw 34 in the proper direction, thereby accommodating the shelling rollers for receiving peas or beans of different sizes. To clean the apparatus, the L-shaped member 58 is lifted about its hinges 59 thereby providing access to the shelling rollers and the area adjacent thereto.

From the foregoing, it will be apparent that we have devised improved apparatus for shelling green beans, peas or the like, which is simple of construction and operation and which is readily adapted for use with convention type driving means, such as the usual food mixer. While we have described the apparatus as being driven by a food mixer, it will be apparent that other means of driving the same may be employed.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claim.

What we claim is:

In apparatus for shelling green beans and peas, a feed hopper having a downwardly sloping bottom wall, a pair of shelling rollers mounted adjacent the lower end of said bottom wall in position to engage the hulls of the beans and peas being shelled, a plate-like member mounted for sliding movement on the upper surface of said bottom wall and confined thereon to movement in a plane substantially parallel to the direction of travel of the unshelled beans and peas, a plurality of downwardly sloping inverted V-shaped substantially parallel guides mounted above and extending substantially parallel to the plate-like member and effective to present the beans and peas end-wise to the shelling rollers, power means connected to said shelling rollers for rotating the same, means operatively connecting the plate-like member to the power means comprising an arm extending transversely beneath the bottom wall of the hopper and pivoted intermediate its ends to said bottom wall, a pin pivotally connecting one end of said arm to the plate-like member, there being an opening in the bottom wall for receiving said pin and permitting movement of the pin and the plate-like member relative to said bottom wall, a link connected at one end to the other end of said arm, and means eccentrically connecting the other end of said link to a rotating part of one of the shelling rollers, whereby the plate-like member reciprocates in a single plane parallel to the direction of travel of the unshelled beans and peas.

References Cited in the file of this patent

UNITED STATES PATENTS

| | | |
|---|---|---|
| 213,168 | Budd | Mar. 11, 1879 |
| 220,800 | Budd et al. | Oct. 21, 1879 |
| 858,608 | Krmpotic | July 2, 1907 |